United States Patent [19]

Appleton

[11] Patent Number: 5,729,669
[45] Date of Patent: Mar. 17, 1998

[54] METHOD AND APPARATUS FOR DISPLAYING MOVIES USING Z-DATA INFORMATION

[75] Inventor: William C. Appleton, Knoxville, Tenn.

[73] Assignee: Cyberflix, Inc., Knoxville, Tenn.

[21] Appl. No.: 333,847

[22] Filed: Nov. 3, 1994

[51] Int. Cl.⁶ ........................................ G06F 15/00
[52] U.S. Cl. ............................................ 395/122
[58] Field of Search ........................... 395/122, 173, 395/174, 175; 345/113, 114, 122

[56] References Cited

U.S. PATENT DOCUMENTS

| | | | |
|---|---|---|---|
| 4,641,255 | 2/1987 | Hohmann | 364/522 |
| 4,679,041 | 7/1987 | Fetter et al. | 340/747 |
| 4,965,753 | 10/1990 | Kraemer | 364/522 |
| 5,016,876 | 5/1991 | Loffredo | 273/437 |
| 5,561,750 | 10/1996 | Lentz | 395/122 |

*Primary Examiner*—Phu K. Nguyen
*Attorney, Agent, or Firm*—Luedeka, Neely & Graham, P.C.

[57] ABSTRACT

A computer display system for real time display of digital movie frames, derived from 24 bit, bit mapped graphic images formed of pixels and 32 bit floating point z values, and sprites which can interact with the movie frames. The system displays movies comprised of a compressed image frame, and a value limited, posterized, and compressed z frame. The incorporation of the novel z frame allows for 24 different levels of interactive, real time clipping of the sprites with the background image frame. The apparatus of an image frame associated with the z frame can also allow for two separate movies comprised of image frames and z frames to be superimposed with precedence clipping between the two independent movies in real time.

29 Claims, 9 Drawing Sheets

5,729,669

METHOD AND APPARATUS FOR DISPLAYING MOVIES USING Z-DATA INFORMATION

FIELD OF INVENTION

The present invention relates to the field of computer graphics display systems, and more particularly to those display systems having graphic images that are displayed in real time and provide the appearance of motion, and which have other graphic images, which also have the appearance of motion, interacting with them.

BACKGROUND AND SUMMARY OF THE INVENTION

There has long been a need for graphics display systems that can present a background image with one or more other images moving about on top of the background image. Such systems are used, for example, in video games. There have been several devices used to provide this need, which have had a limited amount of success at achieving the inherent goals.

In the earliest systems, the static background image had no interaction with the other moving images, or sprites, that where depicted on top of it. In other words, the sprite could move on top of any part of the background image, but could not, for example, go behind a tree depicted in the background image.

Subsequent systems added a limited degree of interaction, in that the background image had certain areas where the sprite was not allowed to go. Such systems are best exemplified by a maze, where the background image is a top view looking down at a map of the maze walls, and the sprite is a character that the operator is attempting to navigate through the maze. The operator is not allowed by the system to move the character through the walls of the maze, but may only move in the areas between the walls. Thus in these systems, one level of interaction between a static background image and a moving sprite was achieved.

More recently other systems have been developed that provide for a limited additional degree of interaction. Using again the example of a maze, these systems show a background image of the maze in perspective as it looks to one who is standing in the maze, with floor, ceiling, and walls disappearing in the distance. A sprite moving about such a background image cannot walk through a wall, as in the previous example, but can walk into an intersecting hallway. When the sprite moves into the intersecting hallway, it will disappear "behind" the wall of the current corridor that is on the foreground side of the intersecting hallway, or in other words, the sprite will be clipped by the wall. Thus there is provided by these systems some limited additional degree of interaction between the moving sprites and the static background image.

One desirable improvement over prior known displays is a system that, instead of having just one or two levels of interaction such as previously described, provides for many levels of sprite clipping. Additionally beneficial is such a system that can provide for this complex degree of interaction, not merely between moving sprites and static background images, but between moving sprites and background images that are displayed in real time, providing the appearance of movement through the scene depicted by the background images.

One difficulty in producing such a system is the amount of data that is required by a system developed using traditional methods. The amount of data required creates several problems. First, there is a problem in providing the storage space required by the graphics data. Next, the size of the graphics data prohibits the system from running on all computers except those few with large memory capacities. Finally, the size of the data required prevents the graphic images from being displayed in real time, because the computer cannot move that volume of data fast enough.

There is a need, therefore, for a graphics display system that can display intricately detailed moving sprite images that can interact in a complex manner with intricately detailed moving background images with the speed required by real time motion on computers readily available to the consumer.

The present invention solves the above mentioned and other needs by providing a computer display system for real time display of digital movie frames, derived from bit mapped graphic images formed of pixels and z values, and sprites which can interact with the movie frames. Source code for the invention is contained in the appendix.

At least one movie is provided. The movie consists of at least one movie frame. In the preferred embodiment there are five movie frames in each movie. Each movie frame consists of an image frame and a z frame. The image frame is a bit mapped image that is formed of rows of pixels. In the preferred embodiment, each pixel is represented by 8 bits.

The z frame has a z value for each pixel in the image frame. The z value has been depth limited and posterized into a whole number that is expressed in 8 bits. The z value is depth limited by setting all the z values greater than a first constant to equal the first constant. The z value is posterized by rounding the quotient of each depth limited z value and a second constant to a whole number.

In the preferred embodiment the first constant is the product of a first and a second predetermined number, and the second constant is the quotient of a first and a second predetermined number. In the preferred embodiment the predetermined first number is 256, the predetermined second number is 6, the predetermined third number is 256, and the predetermined fourth number is 4. Also in the preferred embodiment the depth limited, posterized z values are compressed with a run length encoding scheme on a row by row basis. A header is added to the compressed z values, that contains an index of where each row of z values begins. In the preferred embodiment the z data is used in this compressed form and not decompressed before subsequent use.

There is an image buffer where the current image frame for the movie frame to be displayed is manipulated. A z buffer is provided, where the z frame for the current movie frame to be displayed is located. There is at least one sprite, each sprite being a bit mapped image formed of rows of pixels, with a z value associated with the sprite, preferably a single z value associated with the entire sprite. The image frame in the image buffer, and each sprite to be displayed are interacted in a display buffer.

A processor transfers the current image frame for the movie frame to be displayed to the image buffer. The processor manipulates the image frame in the image buffer, transfers the current z frame for the movie frame to be displayed to the z buffer, and transfers that manipulated image frame in the image buffer to the display buffer. The processor then determines the location in the display buffer where each sprite to be displayed is to be positioned, and compares the z value for each sprite to be displayed to the z values for all those pixels of the image frame in the display buffer that are in the same location as the pixels for the sprite to be displayed. The processor transfers into the display buffer only those pixels of the sprite to be displayed that are in the same location as a pixel of the image frame in the display buffer that has a z value greater than the z value for the sprite to be displayed. At least a portion of the image frame and the sprite in the display buffer are shown on a display.

BRIEF DESCRIPTION OF DRAWINGS

The present invention may best be understood by reference to a detailed description of preferred embodiments when considered in conjunction with the following drawings, in which.

DETAILED DESCRIPTION OF INVENTION

Figure 1:
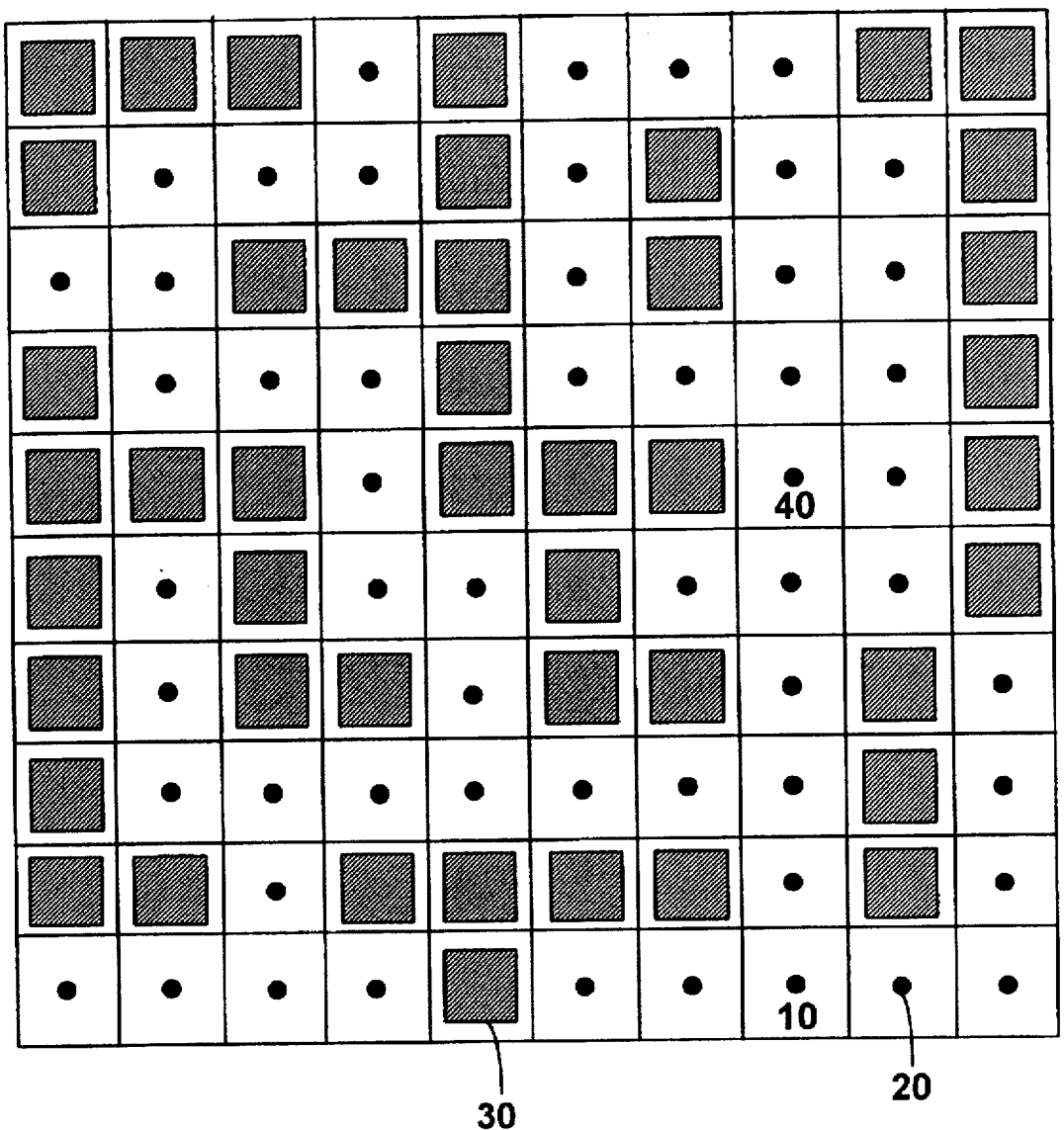
FIG. 1 is a map of a three dimensional virtual environment.

Referring now to the drawings in which like reference characters designate like or corresponding parts throughout the several views, there is shown in FIG. 1 a map of a three dimensional virtual environment. Defining such a map is the first step in constructing a three dimensional virtual environment. The purpose of the a map is to define those areas within the virtual environment onto which the character can move, and those areas onto which the character is not allowed to move.

The map is constructed of an array of blocks 10. The shaded blocks 30 represent areas on the map on which there can be no character movement, and the open blocks 10 represent areas on the map on which there can be movement. In a common application, the shaded blocks 30 represent buildings, and the open blocks 10 represent streets and alleys, or other open areas between the buildings. In this example the map is a grid that is ten blocks long and ten blocks wide. It will be appreciated that this is for representative purposes only, and that an actual map, while it could be of any size, would probably be considerably larger.

Once the map of the environment is laid out, artists create the facade for each visible side of each building. This is done using software specifically created for such work, such as Soft Image, Alias, or Wave Front. While any computer platform could be used to create these images, a Silicon Graphics Indigo Extreme is used in the preferred embodiment. Next the building facades are placed on the map, and a three dimensional virtual environment is created from the two dimensional depictions. Lighting is added to the model, and texture is added to such things as the ground and sky.

After the model has been created, a virtual camera is driven through the model, taking pictures of every possible view along the way. While the term camera is used throughout this discussion, it will be appreciated that there is no camera used in a real sense, but the virtual camera is a series of software routines running on the graphics workstation, that creates a graphic image based on the computer model which has been created. Before taking the pictures, a step size, or in other words a minimum resolution of movement in the z axis, must be determined.

The step size determines how many steps are taken, and hence how many images of the model are displayed, when moving between the center points 20 of two adjacent blocks 10. Any number from one step upwards can be used. Use of just a single step, however, would make movement from one block 10 to the next very jerky. While the motion from one block 10 to the next becomes smoother as the number of steps used increases, this also increases the number of image frames that must be displayed by the system, and likewise which must be stored, and also decreases the amount of time in which the movie frames must be cycled, or the motion will appear to slow down commensurately.

Figure 2:
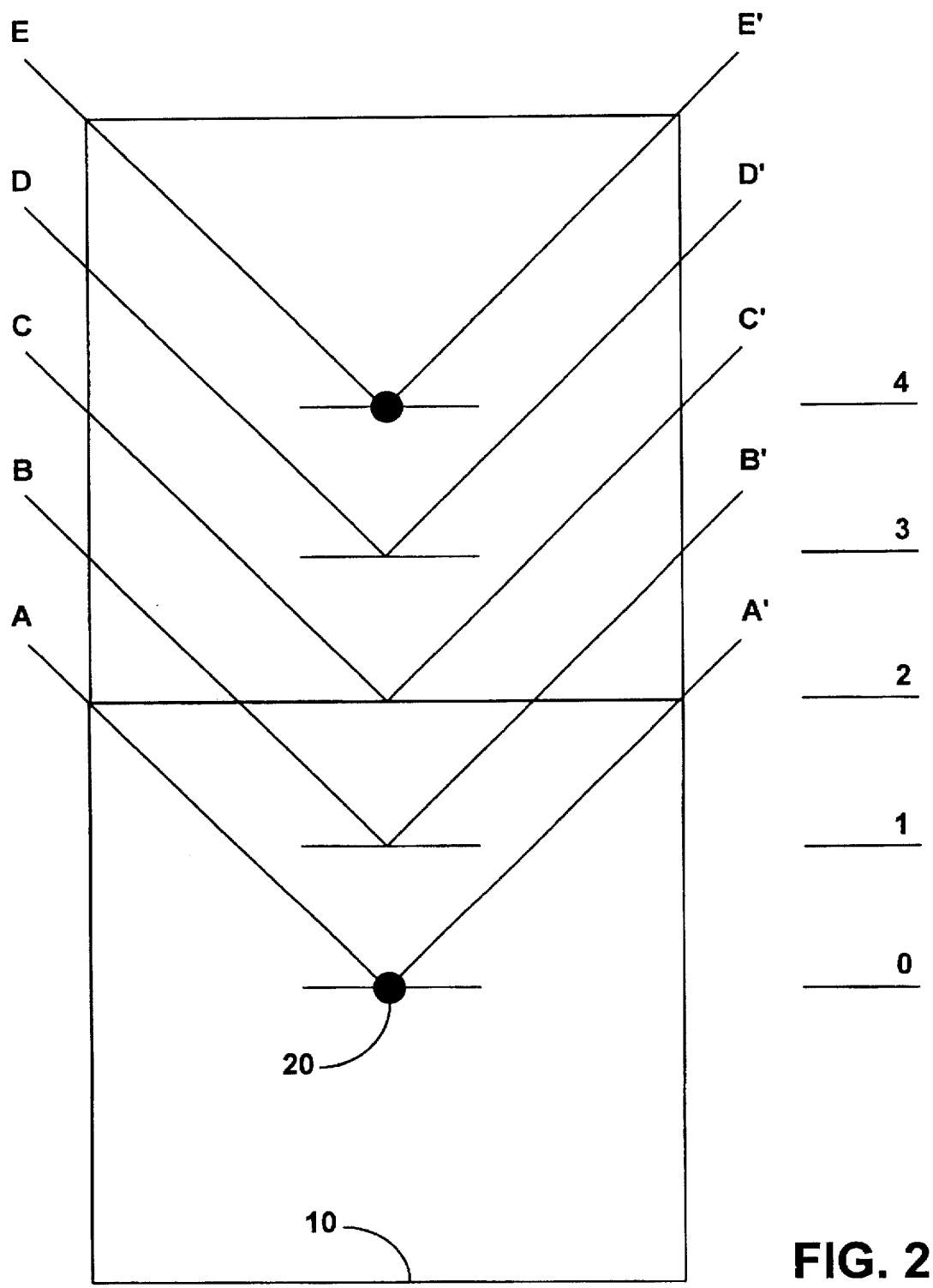
FIG. 2 shows the virtual camera positions for the five image frames contained in a movie depicting translational motion.

In the preferred embodiment the minimum resolution of movement in the z axis is one-quarter block, or four steps per block. As depicted in FIG. 2, this means that four images need to be created, in addition to the current view A–A', to depict movement from one block 10 to the next adjacent block 10. This movement is represented in FIG. 2 by successively displaying views A–A' through E–E' in such a manner as to give the appearance of motion.

Figure 3:
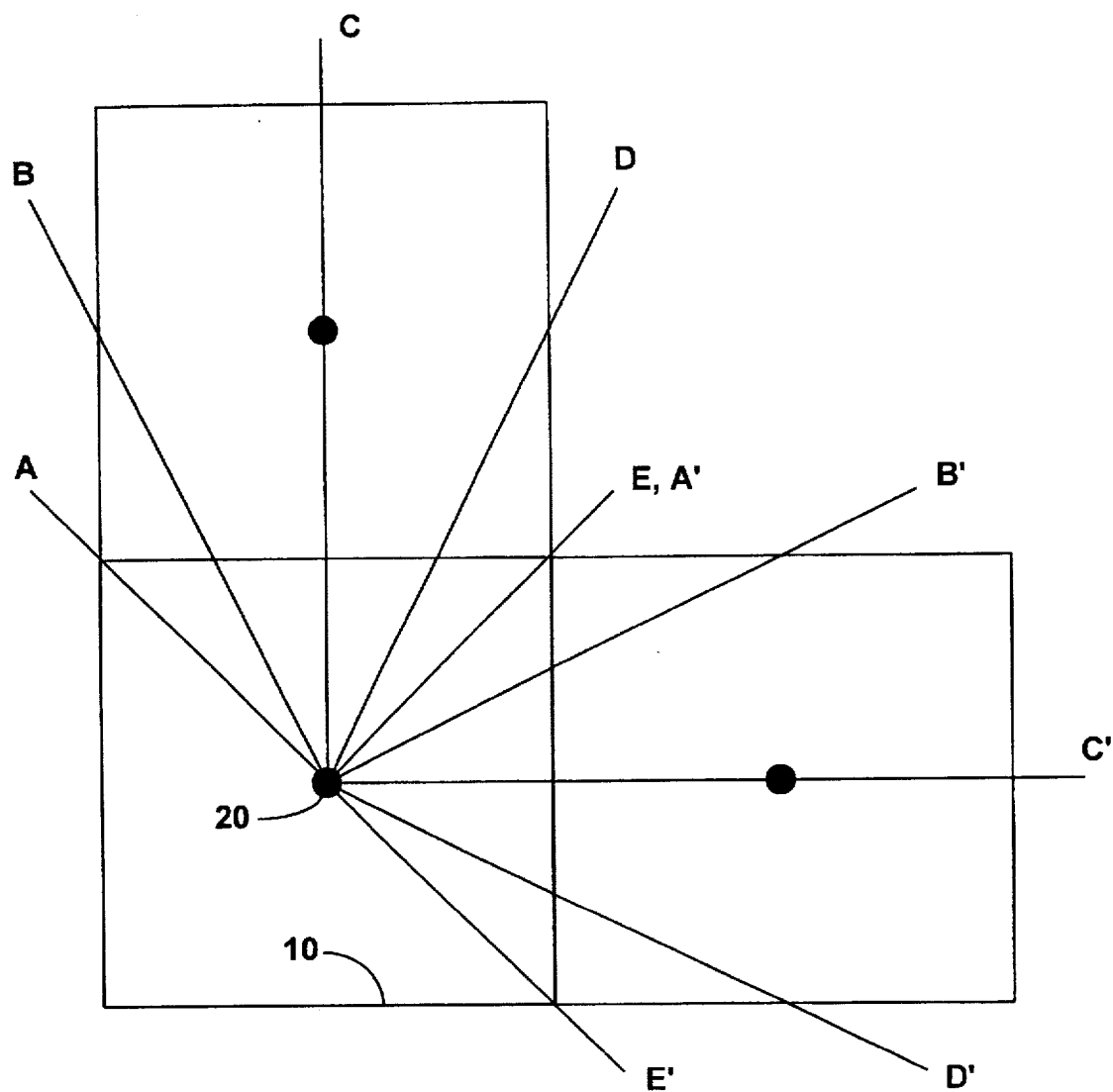
FIG. 3 shows the virtual camera angles for the five image frames contained in a movie depicting rotational motion.

Not only must movement from one block 10 to the next be accounted for, but images representing a turn from a view along one side of the block 10 to an adjacent side of the same block 10 must be generated for each open block 10 in the environment model, as depicted in FIG. 3. While the step size, or rotation increment, for this motion could again be any number, four different views are used in the preferred embodiment, in addition to the current view A–A', to represent a ninety degree rotation within a block 10. This movement is represented in FIG. 3 by successively displaying views A–A' through E–E' in such a manner as to give the appearance of rotation.

Once the above decisions are made, and the information is programmed into the graphics workstation, the virtual camera is driven through the model, taking pictures at every step and every rotation possible within each open block 10. When the camera sees a view, such as that depicted in FIG. 4, it can see along as many blocks 10 as have been created along that axis of the map. By definition, the depth of an image is along the z axis. Of course, all of this information is not required because, just as with normal sight, blocks 10 that are too far away in the model cannot be seen by an operator when depicted on a screen, even if the computer can see them, because the detail would be too small.

For this reason, and to save the time required to render an image of the model with such detail, and to save the data space associated with this unnecessary information, the camera is told to only record a certain number of blocks 10, and to ignore all of the other blocks 10 in the line of sight past that. In the preferred embodiment the camera can see a total distance of six blocks 10. However, since the picture is being taken from the center point 20 of a block 10, a length of six blocks 10 extends to the center point 20 of the seventh block 10.

As the camera creates an image, it starts by drawing those elements found in the first block 10, then the second block 10, then the third, and so on. Of course, some of the elements drawn from the first block 10 will mask, or overwrite, some of those elements in the subsequent blocks 10 if proper perspective is preserved. This is analogous to a building that is closer to us hiding part of another building that is farther away. In addition, some of the elements of each block 10 will logically mask some of the other elements of the same block 10, which masking must be preserved in the recorded image if the image is to be a realistic perspective rendering of a three dimensional view.

The camera does this by associating a z value to each pixel that is to be recorded in the image. The z value for each pixel is created by the rendering software. At the time when the elements of the virtual environment are modeled, they do not exist merely as bit mapped, two dimensional images, but as mathematical models. Every point on a curve or line, and every point on a surface that covers the element defining lines, has been calculated and positioned by the modeling software. Because this is done in a virtual three dimensional environment, the rendering software is able to use the modelling equations to determine the distance between any two points in the environment. A z value is a measure of the distance between a given pixel and the virtual camera location.

All pixels in the blank image with which the camera starts are assigned an arbitrarily large value, representing a back plane which any other pixel brought in as a part of the image can overwrite. All the z values for each pixel brought into the image are kept in a data structure called a z buffer.

As each pixel of each element in the model is brought into the image by the camera, the z value associated with that pixel is compared to the z value in the z buffer for the pixel that is already in that position in the image. If the z value for the new pixel is less than the z value for the pixel already in that position, it means that the new pixel is logically closer than the old pixel, and so the old pixel should not be seen behind the new pixel. The new pixel is drawn into the image, overwriting the old pixel, and the z value for the new pixel is placed in the associated position in the z buffer, overwriting the z value for the old pixel.

If the new pixel brought into the image by the camera has a z value that is greater than the z value for the old pixel that is already in that position in the image, it means that the old pixel is logically in front of the new pixel, and thus the new pixel should not be visible in front of the old pixel. Thus the new pixel and its z value are discarded, and the old pixel is left visible in the image, and the z value for the old pixel is left intact in the z buffer.

For the first pixel brought into the image, the z value associated with the pixel will definitely be less than the arbitrarily large z value assigned all the starting pixels of the back plane present in the starting image, and so the first pixel will overwrite the back plane pixel in the corresponding location, and the z value for the first pixel will overwrite the arbitrarily large z value in the z buffer corresponding to that location. This procedure will proceed for every pixel of every element of each block 10 in the virtual environment that is to be brought into the image.

When this process is complete, there will be a perfect perspective image present in the image buffer used by the camera to assemble the image, and a complete z buffer filled with z values. For every single pixel of the image present in the image buffer, there will be a corresponding z value in the z buffer, which is a measure of the depth of that particular pixel in the image. The pixels in a bit mapped image produced by such a process are represented by 24 bits of color data. The z values are represented by 32 bits of depth data. The purpose of this rendering process is to produce an image in the image buffer for subsequent use.

Figure 5:
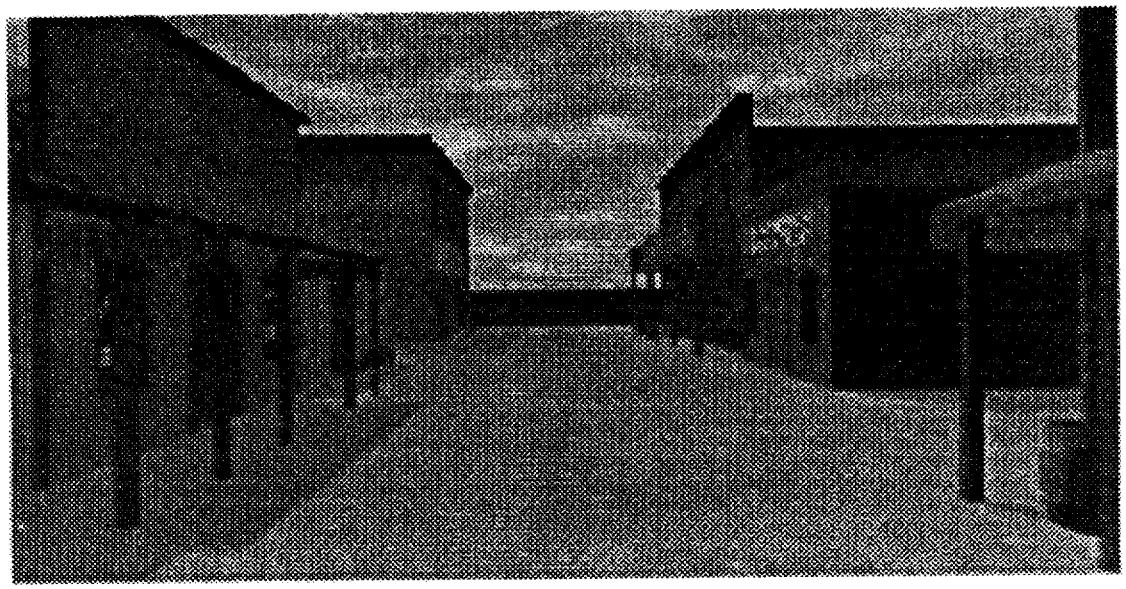
FIG. 5 is a perspective view of the three dimensional virtual environment.
Figure 6:
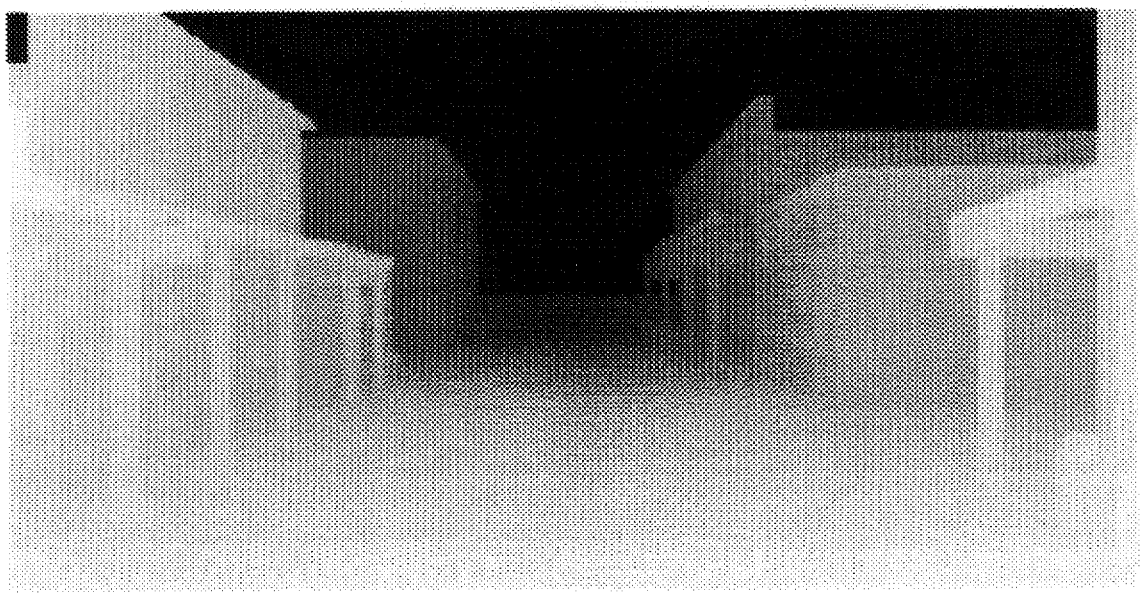
FIG. 6 is a gray scale representation of the z values in the z buffer after rendering.

FIG. 5 depicts one such grayscale image, showing the perspective nature of the image. FIG. 6 is a representation of the z buffer for the image of FIG. 5, using shades of gray to depict the z value for each pixel in the image. In this example, used for explanatory purposes only, larger z values, representing pixels with a greater depth, are depicted in darker shades of gray, and smaller z values, representing pixels with smaller depth, are depicted in lighter shades of gray.

In the preferred embodiment 24 bits of color data is greater than what is required, or even usable by many systems, and so instead of using the more than 16 million colors which this represents in the image, 256 colors are used instead, which can be represented by 8 bits. This reduces the size of a typical image from about 400 kilobytes in size to about one third of that size. Not only does this make the image easier to store because of the reduced storage requirements, but it decreases the amount of time necessary to subsequently display the image, because the computer has only one third of the data to move from the storage device to the display device. In the preferred embodiment the image will also be compressed.

According to the present invention, the z values in the z buffer are used to provide depth information about the image that will later be used in interacting sprites with the image. However, the z buffer holds more data than is used in the preferred embodiment. As each z value is represented by 32 bits, a typical z buffer may be approximately 0.5 megabytes in size. There are two main reasons why this data is not used in its entirety in the preferred embodiment, both relating to the size the z buffer. First, since the image itself was reduced to approximately 130 kilobytes before compression, the z buffer, if it is used in its entirety, represents an overhead four times the size of the actual image. This is large given the number of images usually required to produce a movie, and the storage space usually available.

Second, and again because of the size of the z buffer, any use of the z values in their entirety would use considerable processor time, with a resultant decrease in the speed at which images could be displayed, given a particular processor and processor speed.

However, in a preferred embodiment according to the present invention, the z values in the z buffer are used to create new z values that can be stored in less memory, do not have a large overhead penalty, and may be used more quickly than the original z values.

According to the present invention, the z values in the z buffer are first depth limited. This requires that any z value greater than a first constant be set to equal the first constant. In the preferred embodiment, this constant is determined by the product of a first and a second predetermined value.

The first predetermined value is 256 in the preferred embodiment. The value of 256 is chosen because, when working with the image rendered on the Silicon Graphics workstation of the preferred embodiment, use of this value makes tracking position locations within the image easier for purposes which are not directly related to the disclosure of this invention.

Thus, any z value in the z buffer greater than 1,536 is set to equal 1,536. This results in a z buffer containing values ranging from as small as zero to as great as 1,536. This is still more information than is required, and so the z buffer is posterized.

During posterization, the z values in the z buffer, which may now range nearly contiguously from zero to 1,536, will be stratified into a smaller number of discrete levels. In the preferred embodiment, this will be done by dividing each z value by a second constant, and then rounding off the resultant number to the nearest whole number, which can be represented by 8 bits. The second constant is determined by dividing a third predetermined value by a fourth predetermined value.

Again in the preferred embodiment, the third predetermined value is chosen to be 256, for the same reasons for choosing that value for the first predetermined value, as outlined above. The fourth predetermined value is chosen to be four, because this is the number of steps that was chosen in moving from one block 10 to another, or in other words is the minimum resolution of movement in the z axis as expressed in steps per block. In the preferred embodiment the fourth predetermined number is not chosen to be less than the number of steps.

It should be appreciated that the values chosen in the above examples, of 256, 6, 256, and 4, are not required by the present invention, and that any value could be used in the calculations, depending on the particular requirements of the resultant data structure.

Figure 7:
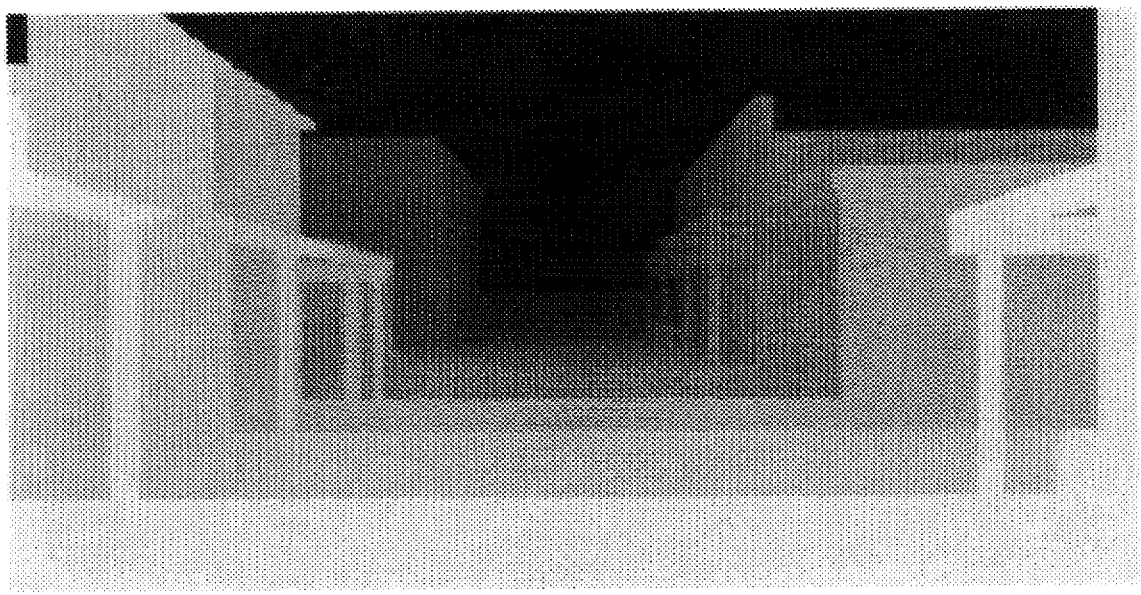
FIG. 7 is a gray scale representation of the z values in a depth limited, posterized z frame.

Thus, by depth limiting and posterizing the z values, the z buffer has decreased in size from 0.5 megabytes to something just over 130 kilobytes, for a savings of 75%. In FIG. 7 there is depicted a gray scale representation of the depth limited, posterized z buffer. When compared to the continuously graded representation of the z buffer in FIG. 6, the distinct depth levels of a depth limited, posterized z buffer represented in FIG. 7 are easily discerned.

Figure 4:
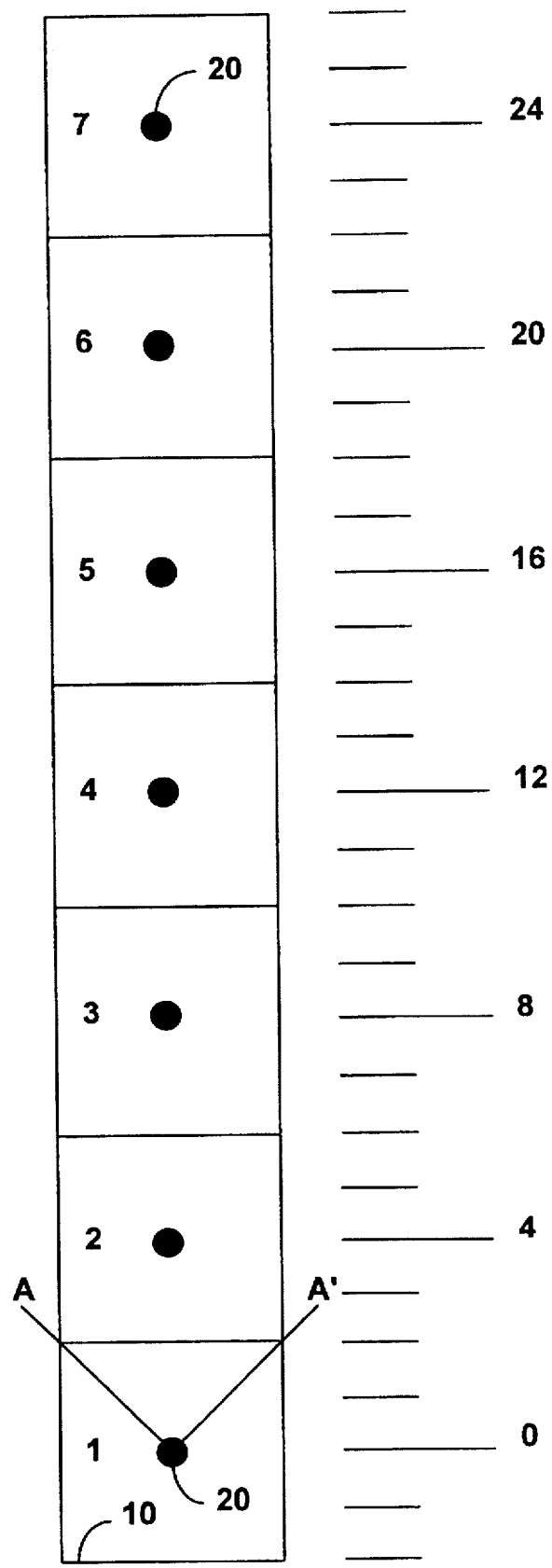
FIG. 4 shows the minimum resolution of movement in the z axis within the six block depth of view.

The z values in the resultant z buffer of the preferred embodiment will now range from 1 to 24. This is exactly how many steps are present in each image taken by the camera, as seen in FIG. 4, remembering that each image will see a total of six blocks, and that there are four steps within each block. From the above discussion it is observed that the z depth of every image in a movie is twenty-four steps, and the z value of every sprite is a whole number from one to twenty-four. Thus the z depth resolution of the movie and the sprite are equal to each other, and equal to a single step. When motion begins, it is synchronized with the z depth of view, and each step is taken at precisely the minimum resolution of the z depth in the movie and the sprite.

In the preferred embodiment, the z buffer will be further reduced in size by using run length encoding on a row by row basis. Because the only valid numbers for the z values are those from 1 to 24, many of the z values in a row will be the exact same number as the value in the position either immediately before it or immediately after it in the row. Thus the z values in a row can be represented by the actual number, followed by the number of subsequent z values in that row that have the same value.

By using run length encoding on the z buffer, its size can typically be further reduced from something just over 130 kilobytes, to something in the neighborhood of 10 kilobytes, for a total size reduction of about 98%. This represents an overhead for each image, in an uncompressed form, of just under 10%, which does not significantly impact performance.

Each of the images generated by the virtual camera are placed in compressed form in a data structure called an image frame. The z values in their depth limited, posterized, and compressed form are placed into a z frame. Added to the beginning of the z frame is an index header, that gives the location in the z frame for the start of the z values for each row of the image frame. The image frame and its associated z frame are put into a single data structure called a movie frame.

All of the movie frames required to depict the movement from the center point 20 of an open block 10 to the center point 20 of an adjacent block 10 are placed in a single data structure called a movie. Similarly, all of the movie frames required to depict a 90° rotation about the center point 20 of an open block 10 are also placed in a single movie data structure.

As shown in FIG. 2, even though the step size and rotation increment have been set at four, in the preferred embodiment, five images are used to depict a forward movement from one block to the next, or a 90° rotation. This is because a fully detailed image of the position prior to movement, represented by view A-A', is included at the beginning of each movie. Thus the second movie frame, represented by view B-B', contains the image frame of the image at the first step, and the fifth movie frame, represented by view E-E', contains the image frame of the image at the fourth and final step. FIG. 3 shows, in a manner similar to that of FIG. 2, the five views contained in a movie of a 90° rotation about a center point 20.

When finished, there will be hundreds, and typically even thousands, of movies representing movement from each center point 20 of each open block 10, back and forth in each linear movement direction possible, and representing four 90° rotations in each direction about each center point 20 in the virtual environment.

Figure 8:
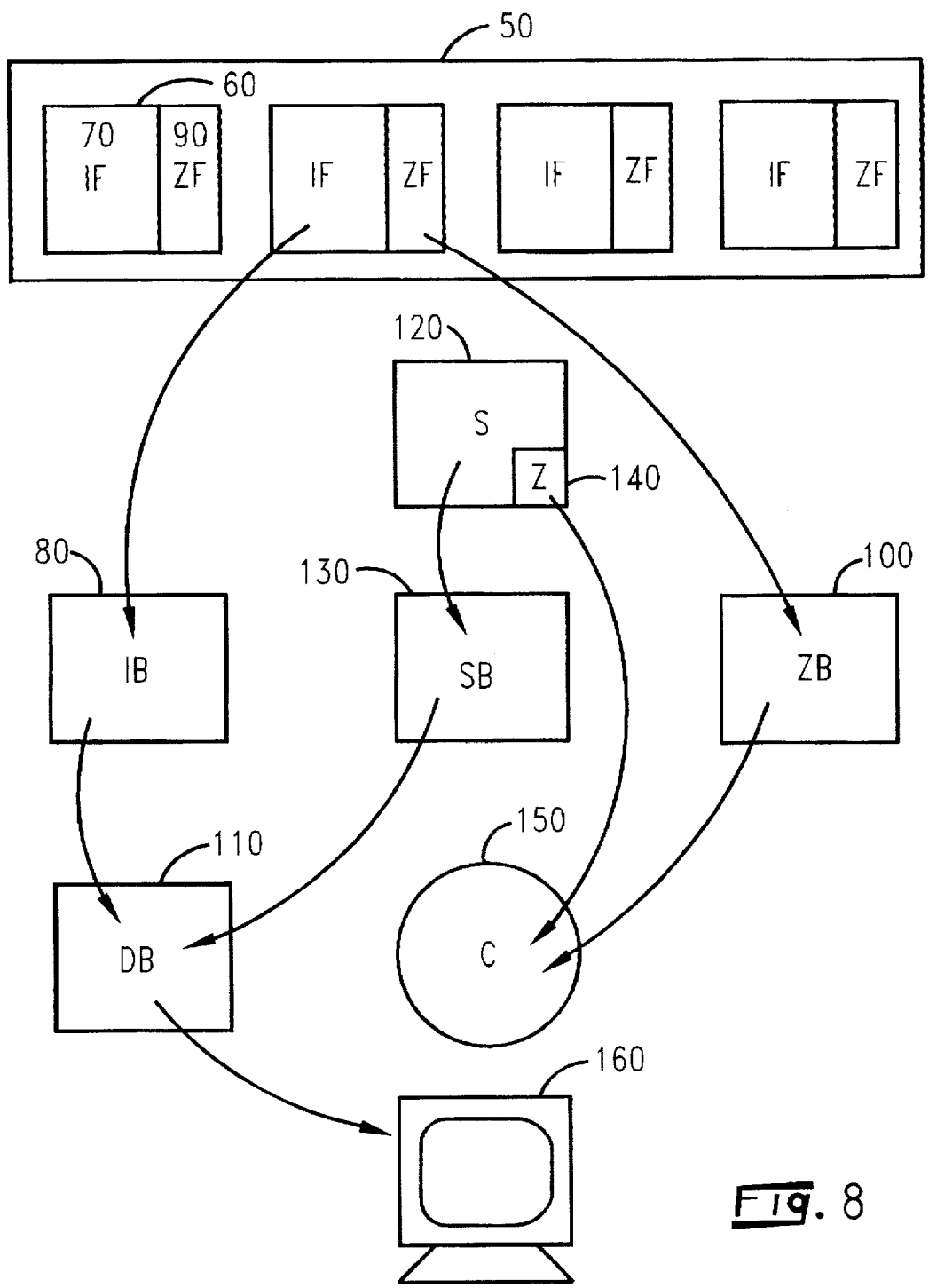
FIG. 8 is a conceptual diagram of the steps used in clipping a sprite image into an image frame.

As depicted in FIG. 8, at run time, when the operator presses a key representing to the system the command to play a movie 50 depicting a movement or rotation, the appropriate movie 50 is moved from the storage device to a memory location. The first movie frame 60 within the movie 50 is processed first. The image frame 70 is moved to an image buffer 80 in memory, and the associated z frame 90 is moved to a z buffer 100 in memory. In the image buffer 80, the image frame 70 is manipulated. In the preferred embodiment the manipulation would include, in part, decompressing the compressed image frame 70. After manipulation, the image frame 70 is moved to the display buffer 110.

It will be appreciated that throughout this discussion, the term "buffers" may refer to either discrete devices, or preferably to predetermined memory locations in RAM in a computer. When data is "moved" or "transferred" from one location to another, it will be appreciated that it may be physically moved to another device, or preferably moved to a new location in RAM, or pointers indicating the location of different data structures may be updated, or memory locations may be redefined.

After the manipulated image frame 70 has been loaded into the display buffer 110, the system determines which sprites 120, if any, are to be displayed. According to a preferred embodiment of the present invention, the sprites 120 will represent other moving elements, such as a walking cowboy, within the virtual environment. In the preferred embodiment, the sprites are under program control. The sprites 120 to be displayed are loaded into a sprite buffer 130.

In the preferred embodiment, each sprite 120 has associated with it a single z value 140 that represents the entire sprite 120. In other applications a sprite 120 could have numerous z values 140 associated with portions of the sprite 120, or a single sprite 120 could be comprised of several contiguous sprites 120, each having a different z value 140 associated with it. Each individual pixel within the image frame 70 has a z value associated with it. The sprites 120 are sorted in descending order according to z value 140. Thus the sprite 120 with the highest z value 140 will be tested for display first.

For each sprite 120 which has been identified for display, the system determines the location in the display buffer 110 where the sprite 120 is to be positioned. The sprites 120 identified for display may have been displayed with the image frame 70 that was in the display buffer 110 immediately proceeding the image frame 70 currently in the display buffer 110. They may occupy the same location within the display buffer 110 as previously calculated, if they are standing still relative to the image frame 70, or they may have a new location within the display buffer 110 if they are moving relative to the image frame 70. Similarly, the system may determine that with the loading of the current image frame 70 into the display buffer 110, a new sprite 120 is now visible. This could be because the sprite 120 came into view during a rotation, or because forward movement brought the sprites 120 which had been outside of the six block depth of view within the six block depth of view.

After a sprite 120 location is determined, the single z value 140 that represents the depth of every pixel in the sprite 120 will be compared to the compressed z values in the z buffer 100 that are associated with the pixels of the image frame 70 in the display buffer 110 that occupy the same positions as the pixels of the sprite 120 to be displayed. This will be done on a pixel by pixel basis.

For example, the location in the display buffer 110 of the left most pixel in the top most row of the first sprite 120 to be displayed will be determined. The z value 140 for the sprite 120 will be compared against the z value in the z buffer 100 that is associated with the pixel of the image frame 70 in the display buffer 110 that is in the same position as that first sprite 120 pixel. If the z value 140 for the sprite 120 is less than the z value for the image frame 70 pixel, then that is an indication that the depth of the sprite 120 pixel is less than the depth of the image frame 70 pixel, and that the sprite 120 pixel should be visible from this perspective on top of the image frame 70 pixel, or in other words, that the sprite 120 pixel should clip the image frame 70 pixel. If this is the case, then the system will copy the sprite 120 pixel into the display buffer 110, over-writing the pixel of the image frame 70 that had previously occupied that position.

If, on the other hand, the z value 140 for the sprite 120 is greater than the z value in the z buffer 100 associated with the pixel of the image frame 70 located in that same position in the display buffer 110, it is an indication that the depth of the sprite 120 pixel is greater than the depth of the image frame 70 pixel, and that the image frame 70 pixel should be visible from this perspective on top of the sprite 120 pixel, and the image frame 70 pixel will clip the sprite 120 pixel. Thus, the image frame 70 pixel will be left in the display buffer 110, and the sprite 120 pixel will be discarded.

If the z value 140 for the sprite 120 is equal to the z value in the z buffer 100 associated with the pixel of the image frame 70 located in that same position in the display buffer 110, it is an indication that the depth of the sprite 120 pixel is equal to the depth of the image frame 70 pixel, and in the preferred embodiment the image frame 70 pixel will clip the sprite 120 pixel. Thus, the image frame 70 pixel will be left in the display buffer 110, and the sprite 120 pixel will be discarded. This procedure continues for each pixel of each sprite 120 to be displayed in the display buffer 110.

The procedure progresses in a similar manner for all the subsequent sprites to be displayed. Should there be a sprite already written into the display buffer in the position located for a new sprite, the new sprite will over write the old sprite. This is done based on the prior sorting of sprites by z value. Therefore, it is already known that subsequently displayed sprites have clipping precedent over previously displayed sprites.

Since the image frame in the display buffer has twenty-four different depth levels as enumerated by the z values in the z buffer, it is possible for sprites to clip at twenty-four different levels. This means that a single sprite may be partially clipped by several different elements of the image frame, and at the same time, the sprite itself may partially clip several other elements of the image frame.

Figure 9:
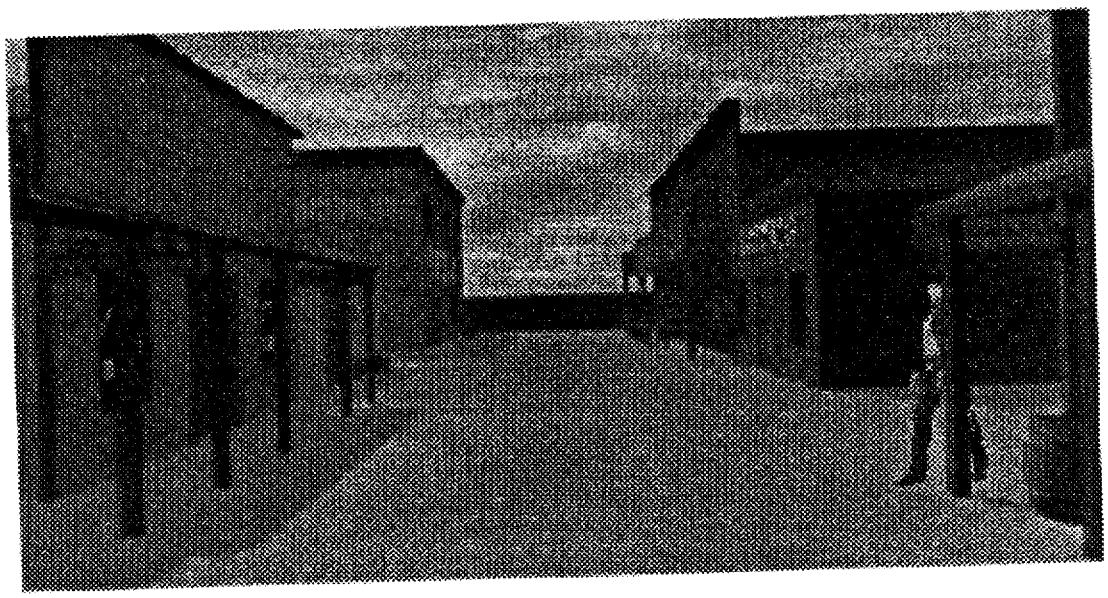
FIG. 9 depicts a cowboy sprite clipped into an image frame.

This is illustrated by the image in FIG. 9, showing a cowboy sprite 170. As can be seen, the cowboy 170 clips several elements in the image, but is clipped itself by the post 180. This is because those pixels of the cowboy 170 that can be seen have an associated z value that is less than the z values associated with those pixels of the image frame which are not visible behind the cowboy 170. Similarly, the z value for the cowboy 170 is greater than the z values associated with the pixels of the post 180 that is visible in front of the cowboy 170.

After all sprites 120 have either been written in to the display buffer 110, or discarded, the display buffer 110 is displayed on a display 160. As soon as this is accomplished, the process of transferring the next movie frame in the movie occurs, with the image frame being loaded into the image buffer, and the z frame being loaded into the z buffer. The image frame is again manipulated and moved into the display buffer, and sprites, either the same ones as displayed before, whether adjusted for movement or not, or new ones, are compared and added to the display buffer as appropriate. This cycle continues until all the movie frames of the movie called for by the operator instruction to the system have been displayed.

If there has been no operator instruction to the system which correlates to a movement, either forward or rotational, then the image frame of the last movie frame of the last movie called for will remain in the display buffer and depicted on the display. However, the sprite interaction with the image frame will continue. For example, a cowboy may walk across the image frame.

Figure 10:
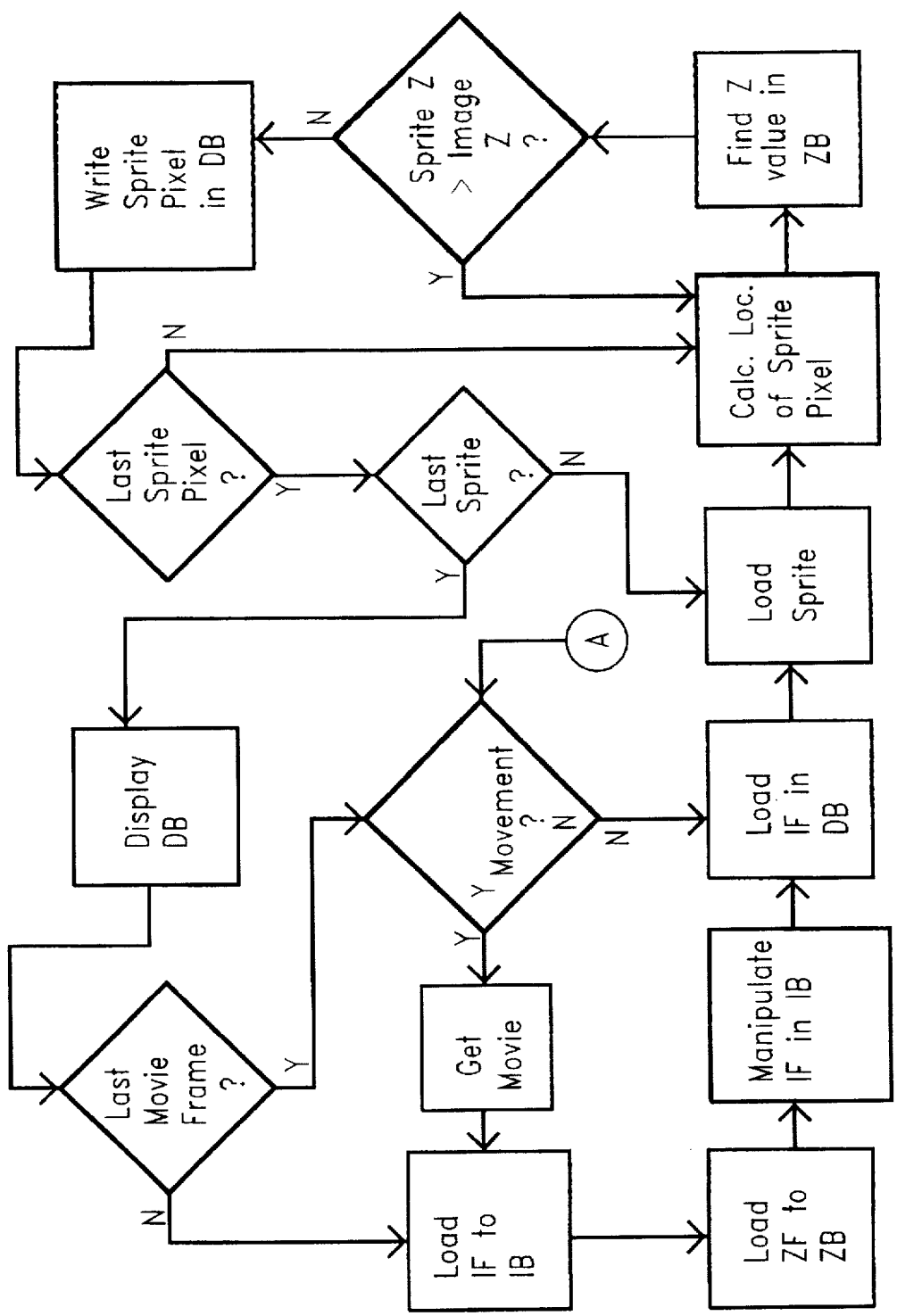
FIG. 10 is a flow chart of the steps used in clipping a sprite image into an image frame.

At a rate commensurate with the rate at which the image frames of a movie are depicted during a move, the last image frame moved to the image buffer will be moved to the display buffer, and the sprites will be clipped in as appropriate to support their motion. Thus while apparently standing still upon a certain block 10 in the virtual environment, the sprites will appear to move about the scene depicted. Still present will be the twenty-four different depth levels for clipping the sprites. A flow chart of this process is depicted in FIG. 10.

For example, as a sprite is controlled to appear to move toward the foreground of the display, an increasingly larger sprite will be clipped into the display buffer, giving the appearance of an object that grows larger as it comes closer. During this movement process, the sprite may initially be clipped behind certain elements of the image frame that are logically closer, but as the forward movement of the sprite continues, the sprite may clip in front of some of those same image frame elements, indicating that the relative position of the sprite is now closer than that of some of the elements in the image frame, and yet still be clipped behind other elements in the image frame.

Although there is only a single data structure for each sprite, sprites can be scaled under program control to a size appropriate to maintain the perspective nature of the sprite within the image displayed. Thus a sprite in the foreground of the display will be scaled to a larger size by the program than a sprite in the background of the display. The program will assign a z value to the scaled sprite commensurate with the degree of scaling. This z value is assigned before the clipping process between the sprite and the image frame begins.

In this manner there is provided by a preferred embodiment of the present invention an ability for moving sprites to interact with either static or moving images depicting background scenes in a highly intricate manner not before achievable.

As will be appreciated from the above discussion, the speed at which each of the individual steps of the loading, comparison, and display cycle can be accomplished is of utmost importance. If any one of the steps takes an undue length of time, there will be pauses in the display of the images. These pauses will destroy the effect of fluid motion in either a movie translation or rotation, or a sprite motion. Thus throughout the process, everything that can reasonably be done to enhance the speed of the system is of great value.

While the z values associated with the image frame were compressed to save storage space and reduce the amount of data needed to be transferred, there was found with the z frame compression a speed benefit if the z frame was left compressed during the comparison cycle, and not decompressed before use as traditional wisdom would dictate.

During the process of comparison of the sprite z value to the z values of all underlying pixels in the display buffer, the system is aware of the current row of the image frame on which it is working. Remembering that there is a header index of rows at the beginning of the z frame, when the system needs to compare the z values, it need only consult the header and can then immediately jump to the proper spot in the z frame for the current row. Then, due to the compression afforded by the run length encoding, the system needs to only check a few values to determine the associated z value for the image frame, instead of scrolling across individually enumerated z values for each pixel in the image frame. In this manner both the step of decompressing the z frame, and the added steps of using uncompressed z values are saved.

While preferred embodiments of the present invention have been described above, it will be appreciated by those of ordinary skill in the art that the invention is capable of numerous modifications, rearrangements and substitutions of parts without departing from the spirit of the invention.

What is claimed is:

1. An apparatus for displaying movies comprising:
   a memory for storing the movies,
   a display for displaying the movies,
   at least one movie stored in the memory, each movie having at least one movie frame, each movie frame further comprising;
      a plurality of image frames, each image frame including a plurality of pixels representing an image, and
      a plurality of z frames, one z frame being associated with each image frame for indicating a z value for each pixel in the image frame,
   a processor for:
      reading the image frames from the movie stored in the memory in a predetermined order,
      transferring the image frames to the display in succession, giving the appearance of motion,
      determining selected z values in the associated z frames for selected pixels in the image frames, and
      selectively modifying the image frame being displayed based in part on the selected z values.

2. The apparatus of claim 1 wherein the z frame further comprises z values that have been depth limited by setting all the z values greater than a first constant to equal the first constant, and posterized by rounding the quotient of each depth limited z value and a second constant to a whole number that can be expressed in 8 bits.

3. The apparatus of claim 1 wherein the z frame further comprises z values that have been compressed with a run length encoding scheme on a row by row basis.

4. The apparatus of claim 3 wherein the z frame further comprises an index header at the beginning of the compressed z values, for indicating where each row of z values begins.

5. The apparatus of claim 4 further comprising the processor for determining the selected z values from the compressed z frame without first decompressing the compressed z frame.

6. The apparatus of claim 1 further comprising:
   at least one sprite, each sprite comprising a bit mapped image formed of rows of pixels, and a z value,
   the processor for selectively transferring pixels of the sprite to the display based on a comparison of the z value for the sprite and the z values associated with the currently displayed image frame.

7. The apparatus of claim 6 further comprising the minimum resolution of the z values associated with the image frame being equal to the minimum resolution of the z value for the sprite.

8. The apparatus of claim 6 further comprising the minimum resolution of movement in the z axis represented between two consecutive image frames being equal to the minimum resolution of the z value for the sprite.

9. A computer display system for display of digital movie frames, derived from bit mapped graphic images formed of pixels and z values, and sprites which can interact with the movie frames comprising:
   at least one movie, each movie further comprising at least one movie frame, each movie frame further comprising;
      a plurality of image frames, each image frame including a plurality of pixels representing an image, and
      a z frame for indicating a z value for each pixel in the image frame, each z value including a z value that has been depth limited by setting all the z values greater than a first constant to equal the first constant, and posterized by rounding the quotient of each depth limited z value and a second constant to a whole number that can be expressed in 8 bits;
   an image buffer for storing the image frames;
   a z buffer where a selected z frame is stored;
   at least one sprite, each sprite including an image formed of pixels, and a z value,
   a display buffer where the image frame in the image buffer and each sprite to be displayed are interacted,
   a processor for:
      transferring an image frame to be displayed to the image buffer,
      manipulating the image frame in the image buffer,
      transferring the manipulated image frame in the image buffer to the display buffer,
      transferring a z frame corresponding to the movie frame to be displayed to the z buffer,
      determining the location in the display buffer where each sprite to be displayed is to be positioned, comparing the z value for each sprite to be displayed to the z values for those pixels of the image frame in the display buffer that are in the same location as the pixels for the sprite to be displayed, and transferring into the display buffer only those pixels of the sprite to be displayed that are in the same location as a pixel of the image frame in the display buffer that has a z value greater than the z value for the sprite to be displayed to produce a composite image in the display buffer; and a display for displaying the composite image in the display buffer.

10. The apparatus of claim 9 further comprising:

the first constant equal to the product of a first and a second predetermined numbers, the second constant equal to the quotient of a third and a fourth predetermined numbers, and the first predetermined number representing a location within the image frame, the second predetermined number representing the depth of field of the image frame as expressed in blocks, the third predetermined number being the same as the first predetermined number, and the fourth predetermined number representing the minimum resolution of movement in the z axis within the image frame as expressed in steps per block.

11. The apparatus of claim 10 further comprising the predetermined first number equal to 256, the predetermined second number equal to 6, the predetermined third number equal to 256, and the predetermined fourth number equal to 4.

12. The apparatus of claim 9 wherein the z frame further comprises z values that have been compressed with a run length encoding scheme on a row by row basis.

13. The apparatus of claim 12 wherein the z frame further comprises an index header at the beginning of the compressed z values, for indicating where each row of z values begins.

14. The apparatus of claim 12 further comprising the processor for using the compressed z frame to determine a z value for pixels of the image frames without first decompressing the z frame.

15. The apparatus of claim 9 wherein the image frame further comprises each pixel represented by 8 bits of data.

16. A method for displaying movies on a display comprising:

providing at least one movie, each movie comprising at least one movie frame, each movie frame comprising;

a plurality of image frames including an image formed of pixels, and a z frame comprising a z value for each pixel in the image frame;

providing at least one sprite, each sprite comprising an image formed of pixels, and a z value, transferring an image frame for the movie frame to be displayed to an image buffer, manipulating the image frame in the image buffer, transferring the z frame for the image frame to be displayed to a z buffer, transferring the manipulated image frame in the image buffer to a display buffer, determining the location in the display buffer where each sprite to be displayed is to be positioned, comparing the z value for each sprite to be displayed to the z values for all those pixels of the image frame in the display buffer that are in the same location as the pixels for the sprite to be displayed, transferring into the display buffer only those pixels of the sprite to be displayed that are in the same location as a pixel of the image frame in the display buffer that has a z value greater than the z value for the sprite to be displayed to produce a composite image in the display buffer, and displaying the composite image on the display.

17. The method of claim 16 further comprising providing a compressed z frame with a run length encoding scheme on a row by row basis.

18. The method of claim 17 further comprising providing an index header at the beginning of the compressed z values in the z frame, for indicating where each row of z values begins.

19. The method of claim 18 further comprising determining selected z values in the z frame without first decompressing the z frame.

20. The method of claim 16 further comprising reducing each pixel in the image frame to 8 bits of data.

21. The method of claim 16 further comprising depth limiting the z values in the z frame by setting all the z values greater than a first constant to equal the first constant, and posterizing the z values in the z frame by rounding the quotient of each depth limited z value and a second constant to a whole number that can be expressed in 8 bits.

22. A method for making movies comprising:

drawing a plurality of image frames configured for display in a predetermined order to give the appearance of motion, each image frame including a plurality of pixels representing an image, and creating a plurality of z frames, one z frame being associated with each image frame, for indicating a z value for each pixel in the image frame.

23. The method of claim 22 further comprising depth limiting the z values in the z frame by setting all the z values greater than a first constant to equal the first constant, and posterizing the z values in the z frame by rounding the quotient of each depth limited z value and a second constant to a whole number that can be expressed in 8 bits.

24. The method of claim 22 further comprising assembling each image frame and the associated z frame into a movie frame.

25. The method of claim 24 further comprising assembling a plurality of movie frames into a movie, the movie frames being in a predetermined order such that when displayed sequentially, the movie frames give the appearance of motion.

26. A movie comprising:

a plurality of image frames adapted for display in a predetermined order to give the appearance of motion, each image frame including a plurality of pixels representing an image, and a plurality of z frames, one z frame being associated with each image frame, for indicating a z value for each pixel in the image frame.

27. The movie of claim 26 wherein the z frame further comprises z values that have been depth limited by setting all the z values greater than a first constant to equal the first constant, and posterized by rounding the quotient of each depth limited z value and a second constant to a whole number that can be expressed in 8 bits.

28. The movie of claim 26 further comprising a plurality of movie frames, each movie frame having an image frame and the image frame's associated z frame.

29. The movie of claim 28 further comprising a movie, the movie having a succession of movie frames in a predetermined order such that when displayed sequentially, the movie frames give the appearance of motion.

* * * * *